(12) United States Patent
Lenaerts et al.

(10) Patent No.: US 11,801,700 B2
(45) Date of Patent: *Oct. 31, 2023

(54) DECORATED NATURAL LEATHER

(71) Applicant: Agfa NV, Mortsel (BE)

(72) Inventors: Jens Lenaerts, Mortsel (BE); Dieter Jancart, Mortsel (BE); Johan Loccufier, Mortsel (BE); Tom Cloots, Mortsel (BE)

(73) Assignee: AGFA NV, Mortsel (BE)

( * ) Notice: Subject to any disclaimer, the term of this patent is extended or adjusted under 35 U.S.C. 154(b) by 441 days.

This patent is subject to a terminal disclaimer.

(21) Appl. No.: 17/056,149

(22) PCT Filed: May 16, 2019

(86) PCT No.: PCT/EP2019/062613
§ 371 (c)(1),
(2) Date: Nov. 17, 2020

(87) PCT Pub. No.: WO2019/224097
PCT Pub. Date: Nov. 28, 2019

(65) Prior Publication Data
US 2021/0213768 A1    Jul. 15, 2021

(30) Foreign Application Priority Data

May 24, 2018 (EP) .................................. 18174028

(51) Int. Cl.
*B41M 5/00* (2006.01)
*B41M 5/52* (2006.01)
(Continued)

(52) U.S. Cl.
CPC ........ *B41M 5/0076* (2013.01); *B41M 5/0047* (2013.01); *B41M 5/5281* (2013.01);
(Continued)

(58) Field of Classification Search
CPC ........ B41M 5/0076; B41M 3/14; B41M 5/00; B41M 5/0047; B41M 2205/40;
(Continued)

(56) References Cited

U.S. PATENT DOCUMENTS 3,809,597 A    5/1974  Connett
3,930,921 A *  1/1976  Connett .................. C14C 11/00
                                                    427/152
(Continued)

FOREIGN PATENT DOCUMENTS

GB    2540011 A    1/2017
GB    2510696 B    4/2017
(Continued)

OTHER PUBLICATIONS

International Search Report dated Jul. 15, 2019 relating to PCT/EP2019/062613, 4 pages.
(Continued)

*Primary Examiner* — Manish S Shah
(74) *Attorney, Agent, or Firm* — Leydig, Voit & Mayer, Ltd.

(57) ABSTRACT

A manufacturing method of decorated natural leather including the steps of: attaching a crusted leather (45) with its corium side by an adhesive (46) to a temporary carrier (47); inkjet printing the crusted leather (45) on its grain side with one or more pigmented inkjet inks; wherein the surface area of the temporary carrier (47) is larger than the surface area of the crusted leather (45).

15 Claims, 4 Drawing Sheets

(51) Int. Cl.
  *C09D 11/101*  (2014.01)
  *C09D 11/102*  (2014.01)
  *C09D 11/30*   (2014.01)
  *C14C 11/00*   (2006.01)
  *D06P 3/32*    (2006.01)
  *D06P 5/30*    (2006.01)
  *C09D 175/04*  (2006.01)
  *B41M 7/00*    (2006.01)
  *C09D 177/00*  (2006.01)
  *D06P 1/44*    (2006.01)
  *D06P 1/52*    (2006.01)

(52) U.S. Cl.
  CPC ............ *B41M 7/00* (2013.01); *C09D 11/101* (2013.01); *C09D 11/102* (2013.01); *C09D 11/30* (2013.01); *C09D 175/04* (2013.01); *C09D 177/00* (2013.01); *C14C 11/006* (2013.01); *D06P 1/44* (2013.01); *D06P 3/32* (2013.01); *D06P 5/30* (2013.01); *D06P 1/5285* (2013.01)

(58) Field of Classification Search
  CPC .... C08G 18/73; C09D 11/101; C09D 11/322; C09D 175/04; C09D 11/326; C09D 11/107; C09D 11/03; C09D 11/037; C09D 11/033; C09D 11/36; C09D 11/40; C09D 11/30; C09D 11/38; C09D 11/32; C09D 11/324; C09D 11/328; C09D 11/102; C09D 11/005; C09D 11/54; C09D 11/52; C09D 11/106; C14C 1/00; D06P 1/44; D06P 5/2005; D06P 1/5285; D06P 3/32; D06P 5/30; C14B 1/56; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598
  See application file for complete search history.

(56) References Cited

U.S. PATENT DOCUMENTS

| | | | | |
|---|---|---|---|---|
| 11,351,805 | B2* | 6/2022 | Jancart | B41M 5/0076 |
| 2008/0008864 | A1* | 1/2008 | Itoh | B41M 5/502 |
| | | | | 427/466 |
| 2010/0233441 | A1* | 9/2010 | Kubota | B41M 5/0076 |
| | | | | 427/510 |
| 2016/0067984 | A1* | 3/2016 | Chung | B41M 5/0256 |
| | | | | 428/196 |
| 2017/0259586 | A1* | 9/2017 | Wilkinson | B41J 2/04586 |

FOREIGN PATENT DOCUMENTS

| | | |
|---|---|---|
| KR | 20170143170 A | 12/2017 |
| WO | 2001032434 A1 | 10/2001 |
| WO | 2013135828 A1 | 9/2013 |

OTHER PUBLICATIONS

Written Opinion dated Jul. 15, 2019 relating to PCT/EP2019/062613, 5 pages.

* cited by examiner

DECORATED NATURAL LEATHER

REFERENCE TO RELATED APPLICATIONS

This application is a 371 National Stage Application of PCT/EP2019/062613, filed May 16, 2019, which claims the benefit of European Application No. 18174028.3, filed May 24, 2018, the contents of which are incorporated by reference herein in their entirety.

TECHNICAL FIELD

The present invention relates to the manufacturing of decorated natural leather and leather articles therewith.

BACKGROUND ART

Today's businesses have an increased focus on the individual customer experience. Customization has transitioned into personalization, as everything from Coca-Cola™ cans to shoes is individualized. This provides big challenges in streamlining the purchasing process and the logistics chain, and is certainly true for the business in leather articles, such as leather car seats, shoes and handbags.

The manufacturing of natural leather articles is well known and can generally be split up in five phases as shown by FIG. 1. The preparatory phase 1 often occurs partly in a slaughterhouse and partly in a tannery, while phases 2 to 4 occur in the tannery and phase 5 occurs at a leather article manufacturer. In a first phase, the preparatory phase, the skin is removed from the animal (flaying) and pre-treated for the second phase of tanning. The pre-treatment may involve processes such as soaking, liming, unhairing, splitting and pickling (adjusting pH for assisting penetration of tanning agents). In the tanning phase, the protein of the rawhide or skin is converted into a stable material that will not putrefy. Chrome is most frequently used as tanning agent whereby the tanned product obtains a pale blue colour, therefore commonly called "wet blue". In the third phase of crusting, the tanned leather is dried and softened. The crusting often includes processes such as stripping (removal of superficially fixed tannins), fat liquoring (fats, oils and waxes are fixed to the leather fibres), dyeing, whitening, physical softening, and buffing (abrasion of leather surface to reduce grain defects). In the fourth phase, called the finishing phase, the leather is made ready for sale to leather article manufacturers. Finishing operations may include lacquer coating, polishing and embossing. In the fifth phase, a leather article is manufactured, involving processes, which may include cutting, perforating, sewing, leather wrapping, decoration and embossing.

Natural leather has been decorated in the past by screen printing. However, screen printing is labour intensive as for each colour an individual screen is required. This is costly and time consuming, especially when personalization or customization is desired.

Digital printing technologies on finished leather have been investigated but many solutions on finished leather remain of inferior quality. Inkjet technologies from textile printing employing heat transfer paper have been explored for leather printing. However just like inkjet printing directly onto natural leather, it was found that a process of inkjet printing dye-based images onto a sheet of transfer paper and then transferring the images onto tanned leather by heat resulted in a quality unacceptable for many luxury leather products. Examples of such inkjet processes are disclosed in WO 01/32434 A (GILHAM) and US 2016067984 A (CHUNG). Aspects such as image quality, light fading of transferred dyes and scratch resistance needed further improvement.

Light fading of dyes can be resolved by using pigmented inks. GB 2510696 (SERICOL) discloses a method of printing onto a leather or synthetic leather substrate by depositing a primer layer onto the substrate, the primer comprising a thermoplastic resin and water; at least partially drying and/or curing the primer; inkjet printing a pigmented hybrid solvent/radiation curable ink onto the primer layer; drying and curing the hybrid ink layer.

Recently high quality decorated leather has been obtained by a method of printing "into" tanned leather with pigmented inks. EP 2825387 A (CODUS) discloses a method of printing into tanned leather comprising the steps of a) applying ink acceptor directly to the surface of the leather; b) applying ink directly onto the acceptor by inkjet; c) applying an additive to the ink; d) heating a surface of a barrier which is substantially impervious to the ink; and e) contacting the heated barrier with the ink acceptor, additive and ink on the leather surface directly to soften the additive, ink acceptor and ink into the leather such that the ink penetrates into the leather.

Printed leather is cut into leather pieces, which are sewed together into leather articles. By inkjet printing on tanned leather, the decoration now moves from the leather article manufacturer to the tannery, while the cutting and sewing of printed leather into leather articles remains at the leather article manufacturer. This causes logistic problems and time delays.

Hence, there is a need for obtaining a more efficient and economical method of manufacturing high quality decorated natural leather articles allowing personalization and having a short delivery time to the customer, as long delivery times reduce the luxury feel.

SUMMARY OF INVENTION

In order to overcome the problems described above, preferred embodiments of the present invention have been realised with a manufacturing method for decorating natural leather according to claim 1.

By having the surface of the temporary carrier larger than the surface of crusted leather, there is room on the carrier of providing positioning markers and an identifier, such as an identification code. By applying an identifier to the temporary carrier, an image printed in the tannery can be identified without error at the leather article manufacturer, who can then immediately proceed to cut out the required leather pieces from the printed leather, thereby avoiding errors and minimizing waste.

The identifier can also be advantageously used for other reasons, like track-and-trace and stock monitoring by both the tannery and the leather article manufacturer. Especially when the identifier is machine readable this results in economical advantages as identification can then proceed in a fast manner.

The decorative image supplied by a computer server can also be inkjet printed without clear separation of intended leather pieces, whereby the cutting pattern stored on the computer server can be retrieved via the identifier. This has the advantage that until effective sale of a leather article, a brand owner can maintain secrecy on the shape of a new collection of the leather article, e.g. a luxury handbag, since the tannery can be left unaware of the shape of leather pieces to be cut out and their possible assembly.

By applying the identifier to a temporary carrier instead of on the crusted leather, the printable surface area of the crusted leather for a decorative image is maximized, especially in combination with the adhesive. The use of an adhesive for adhering the crusted leather to the temporary carrier allows not alone for fast mounting and high productivity, but also maximizes the printable surface area of the crusted leather as no surface area is lost due to mechanical measures, such as clamps for holding the leather, or due to tape for mounting the crusted leather to the printing table of the inkjet printer thereby losing printable surface area.

These and other objects of the present invention will become apparent from the detailed description hereinafter.

DESCRIPTION OF EMBODIMENTS

Definitions

Figure 1:
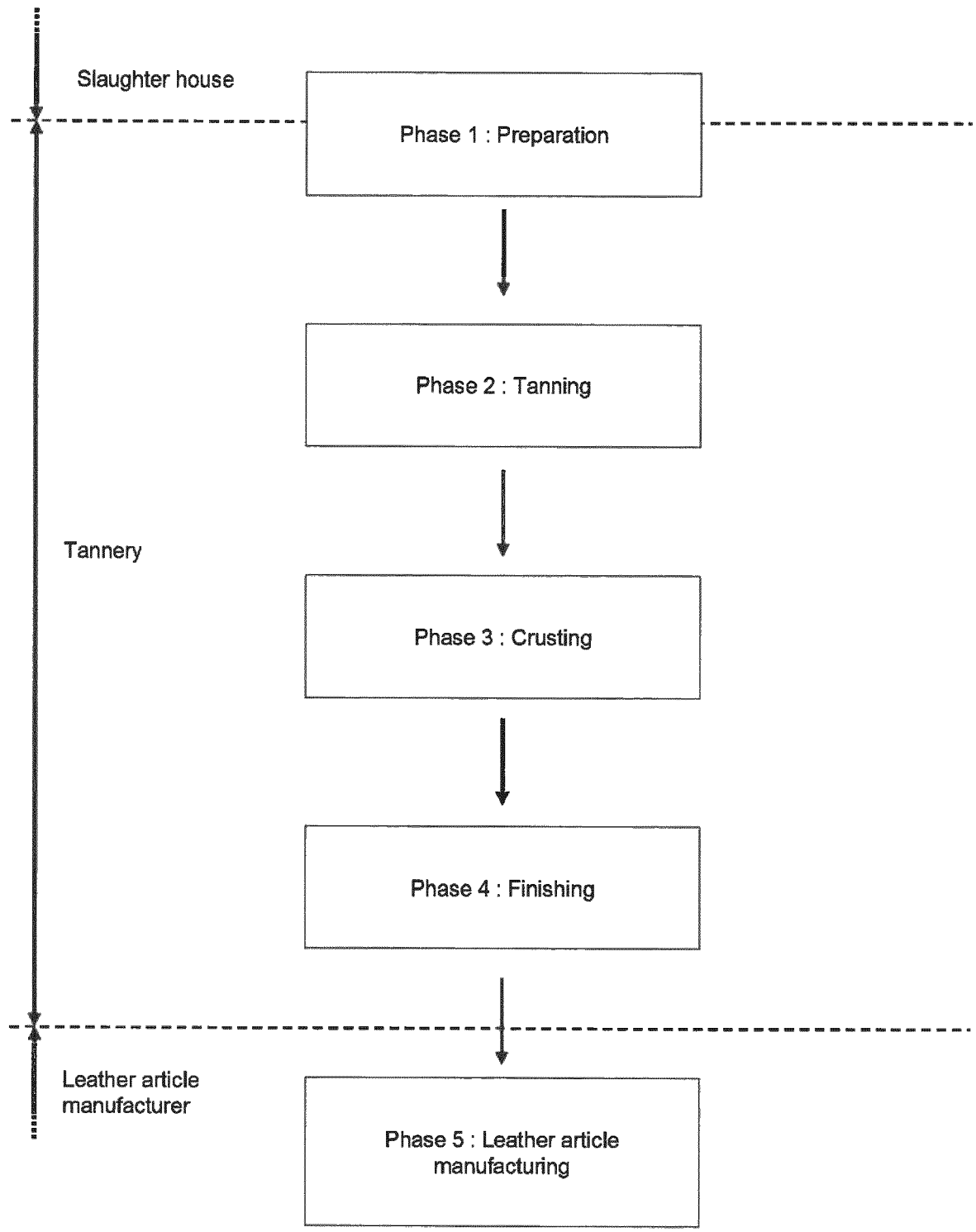
FIG. 1 shows a flow chart of the traditional manufacturing of leather articles involving the different phases and locations.

The term "crusted leather" or "crust leather" means leather that has been tanned and crusted, but not finished.

The term "monofunctional", as used in monofunctional monomers and oligomers, means containing a single polymerizable group.

The term "polyfunctional", as used in polyfunctional monomers and oligomers, means containing a two, three or more polymerizable groups.

The term "oligomer" means a compound polymerized from 2 to 50 monomers.

Manufacturing Methods of Decorated Natural Leather

A manufacturing method of decorated natural leather according to a preferred embodiment of the present invention includes the steps of: attaching a crusted leather (45) with its corium side by an adhesive (46) to a temporary carrier (47); inkjet printing the crusted leather on its grain side with one or more pigmented inkjet inks; wherein the surface area of the temporary carrier is larger than the surface area of the crusted leather.

The excess surface area is preferably used for the application of one or more identifiers and/or positioning markers. The positioning markers may already be present on the temporary carrier prior to the attachment of the crusted leather, whereby some of them remain visible after attachment of the crusted leather. In a preferred embodiment of the manufacturing method, the temporary carrier (47) includes an identifier (9) containing alphanumeric data or a machine readable code and/or one or more positioning markers (10).

A temporary carrier means that the carrier is present during a certain period of the manufacturing process, e.g. during inkjet printing and/or cutting. The temporary is separated from the leather prior to assembling cut leather pieces into a leather article.

In a preferred embodiment of the manufacturing method, the temporary carrier (47) is a paper foil or a plastic foil. The advantage of such a foil, that human transport of a decorated natural leather remains feasible due to the low weight contribution of the foil, especially when compared to a metallic, a wooden or a plastic plate as temporary carrier.

In a preferred embodiment of the manufacturing method, the plastic foil is a transparent or translucent plastic foil. This allows for back-lighting the crusted leather attached to the plastic foil, so that the printable surface area and leather defects, such as bite marks and holes, are easily detected when scanning the temporary carrier with crusted leather attached thereto.

In a preferred embodiment of the manufacturing method, the adhesive is applied by coating or spraying, preferably by spraying. This allows for fast mounting the leather on the temporary carrier, thus resulting in higher productivity. The spraying may be conducted on the surface of the temporary carrier or on the corium side of the leather as desired.

In a preferred embodiment, the manufacturing method further includes a step of scanning the temporary carrier (47) with the attached crusted leather for determining a printable surface on the crusted leather (45). The printable area can be identified by using a scanning step, thus resulting in minimal waste.

In a preferred embodiment of the manufacturing method, the temporary carrier (47) includes markings for positioning the temporary carrier with the attached crusted leather on an inkjet printer so that the decorative image (43) is printed on the printable surface. This result in an improvement of productivity as fast loading of the crusted leather in the inkjet printer can be realized. When also a scan has been performed and an identifier was provided on the temporary carrier, the scanned information can be retrieved automatically through the identifier for defining the printable area in the inkjet printer.

In a preferred embodiment of the manufacturing method, the adhesive (46) exhibits a higher cohesion with itself and a higher adhesion to the temporary carrier (47) than the adhesion to the crusted leather (45). If this is the case, the adhesive can be easily removed from the corium side of the leather without causing any damage to leather.

In a preferred embodiment of the manufacturing method, a base coat (44) is applied on the grain side of the crusted leather (45) before the step of inkjet printing. It has been observed that such a base coat improves the image quality as leather contains irregularities and large concavities caused by remaining follicle mouths (pores of the skin) and wrinkles originally present in raw hide or skin. Upon inkjet printing, ink gathers in these irregularities and large concavities, thereby causing uneven colour densities. These irregularities and large concavities are smoothed out by applying a base coat consisting of one or more layers.

In a particularly preferred embodiment of the manufacturing method, the base coat (44) includes a polymer or copolymer based on polyurethane. The presence of a polymer or copolymer based on polyurethane was beneficial for good flexibility. An enhanced compatibility between UV pigmented inkjet inks and the leather was also observed.

In a particularly preferred embodiment of the manufacturing method, the base coat (44) is also applied on the temporary carrier coated or sprayed with the adhesive. The advantage of this is that inkjet printed leather on a temporary carrier can be stapled without sticking problems, because the stickiness from the adhesive present on the temporary carrier not covered by leather is neutralized by the base coat.

In a preferred embodiment of the manufacturing method, the adhesive (46) is a pressure sensitive adhesive. A pressure sensitive adhesive is an adhesive, which forms a bond between the leather and the temporary carrier when pressure is applied. No solvent, water, or heat is needed to activate the adhesive. Using a pressure sensitive adhesive results in an improved productivity. If the leather is not perfectly flat on the temporary carrier, part of the leather can be easily detached for re-attaching it in a flat manner. Such attachment and subsequent removal on an object without damaging the object is well-known from the Post-It™ notes developed by 3M.

In a preferred embodiment of the manufacturing method, the one or more pigmented inkjet inks are one or more radiation curable pigmented inkjet ink, more preferably one or more UV curable pigmented inkjet inks. A high image quality can be obtained by using UV curable pigmented inkjet inks as UV curing can quickly "freeze" a decorative image after jetted ink drops landed on the leather or the base coat. More preferably, a UV curable pigmented inkjet ink contains water or organic solvent in an amount of less than 25 wt %, more preferably less than 15 wt % and most preferably 0 to 10 wt % based on the total weight of the ink. If no or only a limited amount of water or organic solvent is present, then the penetration of the inkjet inks in pores of the crusted leather is restricted and enhanced image quality is obtained.

In a preferred embodiment of the manufacturing method, a top coat (42) is applied onto the decorative image and the base coat. The top coat acts as a protective layer for the decorative image against, for example, scratches.

In a particularly preferred embodiment of the manufacturing method, the crusted leather (45), the base coat (44), the decorative image (43) and the top coat (42) are heat pressed and/or embossed. Such a method of heat pressing is known from WO 2013/135828 A (CODUS) to make at least part of the sandwich "base coat/decorative inkjet image/top coat" penetrate and fuse into the leather. Embossing is generally used to provide a leather with a design, for example, the grain structure of other animals may be copied to a certain leather. Usually, embossing is done on the grain side by compressing the leather grain structure. As the uncompressed leather fibres remain above, a three-dimensional effect is created.

Leather is sometimes ironed to smooth the leather or to make it shinier. Smooth leather is also less sensitive and easier to clean.

The decorative image is inkjet printed on the base coat using one or more pigmented inkjet inks. Contrary to most dyes, pigmented inkjet inks guarantee a good light fastness as the leather articles are often used in outdoor conditions. The one or more pigmented inkjet inks may be aqueous inkjet inks, but are preferably UV curable pigmented inkjet inks, because UV curing rapidly "freezes" the inkjet printed decorative image. The resulting good image quality contributes further to the luxury aspect of the decorated leather article.

There is no real restriction on how the identifier is applied. The identifier can be applied by a label, writing, printing, laser marking or the like, but in a preferred embodiment it is applied by inkjet printing. An advantage thereof is that it can be inkjet printed together with decorative images minimizing errors and reducing economical cost. In a particularly preferred embodiment, the identifier includes one or more identification codes that are machine readable. Labels have the disadvantage that they can get detached from the leather in manufacturing steps after the inkjet printing, e.g. application of a top coat.

In an alternative embodiment, an identifier is applied prior to the application of the decorative image. This can be advantageously used, for example, by linking a certain leather crust to a digital file that stores information of the shape and defects on the leather crust. This information is obtained by scanning the leather crust for its shape and defects. Leather is a natural product and is thus not a homogenous product. It may contain holes, bite marks, scratch marks from barbed wire and the like, all influencing the image quality. These areas are then stored in the digital file as non-printable areas.

A plurality of identifiers, preferably multiple machine-readable identification codes, may be used. For example, if multiple leather crusts are present on the temporary carrier for different leather manufacturers.

In a preferred embodiment of the manufacturing method, the crusted leather, the base coat, the decorative image and the top coat are heat pressed. Such a method is known from WO 2013/135828 A (CODUS) to make at least part of the sandwich "base coat/decorative inkjet image/top coat" penetrate and fuse into the leather.

The crusted leather is preferably scanned prior to inkjet printing in order to identify a printable area (53) and a non-printable area (52), such as a hole or a bite mark. The scanned leather image (51) can be used for nesting sub-images (55), where after the leather image containing nested sub-images (54) is inkjet printed on the crusted leather, preferably on a base coat on the crusted leather. By scanning the surface of the natural leather for holes, bite marks or other surface defects prior to inkjet printing, minimal waste of leather is made as a computer calculates the optimal lay-out of the sub-images of the desired decorated leather pieces, taking into account the detected holes and defects as a non-printable area for an image to be inkjet printed.

Decorated Natural Leather and Leather Articles

Figure 3:
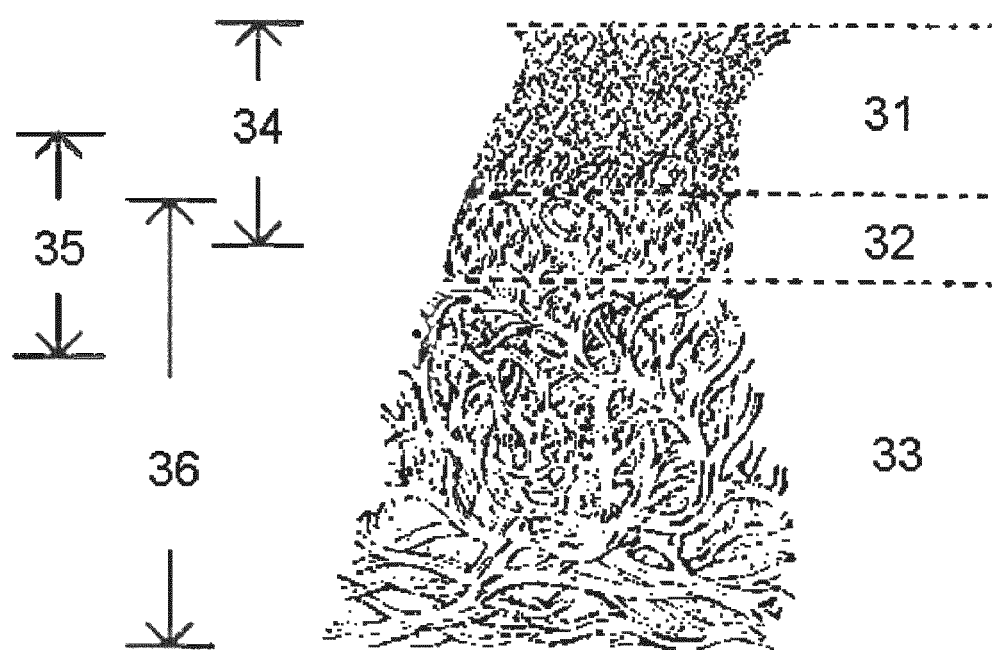
FIG. 3 shows schematically a cross-section of an animal skin including a grain (31) and a corium (33) separated by a junction of grain and corium (32). The different leathers made from the animal skin include full grain leather (34), top grain leather (35) and split leather (36).
Figure 4:
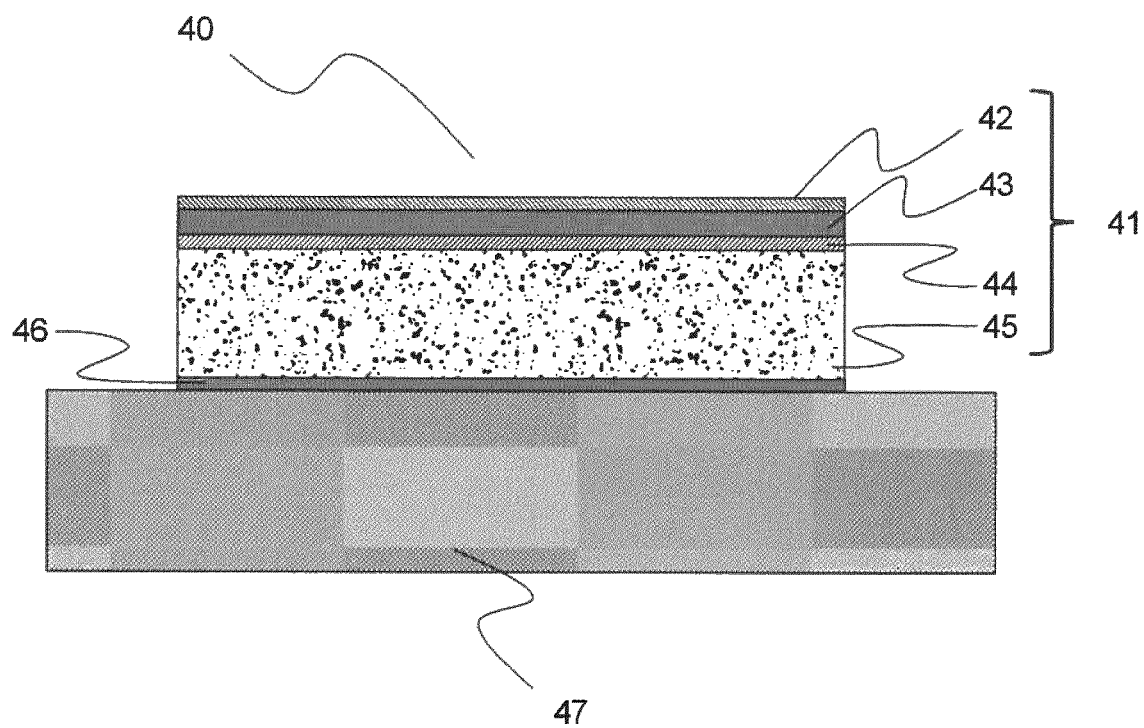
FIG. 4 is a schematical representation of an assembly (40) of a temporary carrier (47), an adhesive (46) and a decorated natural leather (41) including on the crusted leather (45), a base coat (44), the decorative image (43) and a protective top coat (42).

Natural leather comes in different grades (see FIG. 3), such as full grain (34), top grain (35) which is essentially full-grain but with part of the grain layer sanded and the underlying split layer removed, and split leather (36). For the latter, the underlying layer of the hide is removed and used to create split leather. Depending on the thickness of the underlying layer, many splits can be created. Split leather has a rough appearance and is usually used to make suede.

For preventing grain damage and weakness, the hide or skin is tanned preferably by chrome, but other tanning methods such as vegetable tanning may also be used. After tanning, the leather is dried and softened into so-called crusted leather. The crusting may include processes such as stripping (removal of superficially fixed tannins), fat liquoring (fats, oils and waxes are fixed to the leather fibres), dyeing, whitening, physical softening, and buffing (abrasion of leather surface to reduce grain defects).

The decorated natural leather may be used for manufacturing a wide range of leather articles. Preferred leather articles include footwear, furniture, upholstery, bags and luggage, gloves, belts, wallets, clothing, automotive leather (e.g. train, plane, boat and car seats), interiors, books and stationary, packaging, equestrian articles and the like.

The result of the manufacturing method obtained in the present invention after inkjet printing is an assembly (40) of a decorated natural leather (41) attached by an adhesive (46) to a temporary carrier (47). The inkjet printed decorative image (43, 54) may be composed of nested sub-images (55) to be cut out as leather pieces. The cutting may occur after removal of decorated natural leather from the temporary carrier, but is preferably performed when the decorated natural leather is still attached to the temporary carrier. In the latter case the identifier is used to retrieve the cutting pattern from a computer, preferably the computer server as the cutting may be performed by the leather article manufacturer instead of the tannery. Another advantage of the assembly (40) is that it facilitates transport between the tannery and the leather article manufacturer as the assemblies can be easily stapled onto pallets. The identifier, preferably a machine-readable identification code, on the assembly can be used to identify the leather article manufacturer, thus aiding in the logistic process.

Adhesives

An adhesive (46) is used for attaching a crusted leather (45) with its corium side to a temporary carrier (47). The adhesive may be applied to the temporary carrier, to the leather of to both of them.

Any adhesive known in the art can be used in the present invention, going from classical known adhesives to biomimic based adhesives. Repositionable adhesives are preferred, as they facilitate the process for ensuring that the leather is attached completely flat on the carrier causing no collision with the inkjet print heads.

Bio-inspired reversible adhesives have been described by del Campo and Fernández-Blázquez (Biomimetic Approaches for Biomaterial Development, chapter 11, ed. Joao F. Mano, Wiley-VCH Verlag GmbH& Co. KGaA, first edition, 2012).

Adhesives are known in different fields of technology such as textile printing, where water gluing and dry bonding approaches are used. Within dry bonding approaches, both permanent and thermoplastic adhesives are known in the art.

Adhesives for textile printing are disclosed in Ullmans Encyclopädie der technischen Chemie, 4. Auflage, Band 23, 76-77 (VERLAG CHEMI, WEINHEIM).

In the present invention, pressure sensitive adhesives are a particular preferred type of adhesives. Pressure sensitive adhesives have been discussed in detail by Creton (MRS Bulleting, 434-439 (2003); Materials Science and Technology, A comprehensive treatment, Volume 18, Processing of Polymers, Chapter 15, Material Science of Pressure-Sensitive Adhesives, Wiley-VCH (2012))). Removable pressure sensitive adhesives are also known from applications such as the Post-It™ notes from 3M.

Preferred polymers for pressure sensitive adhesives are selected from the group consisting of polyacrylates, silicone polymers, polydienes or copolymers thereof such as natural rubber and styrene-butadiene type of rubbers and block copolymers of styrene and a diene. Typical formulations of pressure sensitive adhesives further contain tackifying resins to tailor the properties towards the application. Pressure sensitive adhesives further can contain additives such as waxes, plasticizers and anti-oxidants.

The pressure sensitive adhesive is applied on a surface from water, a solvent or as a hot melt adhesive. Hot melt adhesives and water borne adhesives are preferred. Water borne adhesives are particularly preferred, Water borne pressure sensitive adhesives are emulsion-based and have been described in detail by Jovanović and Dubé (Journal of Macromolecular Science, Part C-Polymer Reviews, C44(1), 1-55 (2004)).

Suitable adhesives are available from KIWO (KISSEL+ WOLF GmbH).

There is no limitation on the way of applying the adhesive to a surface, which may be e.g. by coating or by spraying. Repositionable spray adhesives are preferred as they cause no or very limited damage to the corium side upon separating the carrier from the leather. A commercial example of a suitable spray adhesive is the 3M™ Repositionable 75 Spray Adhesive. Spray adhesives are also known as aerosol adhesives.

Temporary Carriers

There is no real limitation on the type of temporary carrier. Preferred temporary carriers for the present invention are polymeric, because of their light weight compared to e.g. metal temporary carriers. Synthetic polymers or natural polymers may be used for the temporary carrier.

Preferred natural polymers are cellulose based, such as plain paper or resin coated paper, e.g. polyethylene or polypropylene coated paper. Particularly preferred as temporary carrier is Kraft paper, as it is sufficiently strong and cheap.

Preferred synthetic polymers for the temporary carrier are polyethylene, polypropylene, polycarbonate, polyvinyl chloride, polyesters like polyethylene terephthalate (PET), polyethylene naphthalate (PEN) and polylactide (PLA) and polyimide. A foil of polyethylene terephthalate (PET) is a particularly preferred as temporary carrier because of its recyclability.

The temporary carrier may be transparent, translucent or opaque. Preferred opaque substrates includes so-called synthetic paper, like the Synaps™ grades from Agfa-Gevaert that are opaque polyethylene terephthalate foils having a density of 1.10 g/cm$^3$ or more. Particularly preferred are Synaps™ OM135AP and Synaps™ OM135AR because they are pre-coated with an adhesive layer.

A white opaque temporary carrier has the advantage of providing a good contrast for the identifier, which generally has a black colour.

There is no restriction on the shape of the substrate. It can be a flat sheet, such a paper sheet or a polymeric sheet, or it can come in the form of a roll of paper or polymeric foils.

Another type of suitable material for the temporary carrier are textiles. A preferred textile is canvas, as it is an extremely durable plain-woven fabric that can be re-used multiple times.

Identifiers

An identifier may be used for different purposes. The identification code may be used for track-and-trace purposes throughout the manufacturing chain in both the tannery and the leather article manufacturer, and even in the delivery from the factory of the leather article manufacturer to the shop where it was ordered or the home of the customer. If multiple factories of one or more leather article manufacturers are involved, then the identification code can be efficiently used in the logistics process for getting the inkjet printed leather to the correct factories.

In a preferred embodiment, the identifier containing alphanumeric data or a machine readable code on a temporary carrier (47), whereon a decorated natural leather (41) is attached by an adhesive (46), is used for at least one of the following purposes: a) identifying the leather article manufacturer; b) identifying a leather article to be manufactured using the decorated natural leather by a leather article manufacturer for a certain customer; c) cutting the decorated natural leather (41) into leather pieces; d) identifying the customer of the leather article; e) authentication of the leather article; and f) delivering the leather article to the customer.

Figure 6:
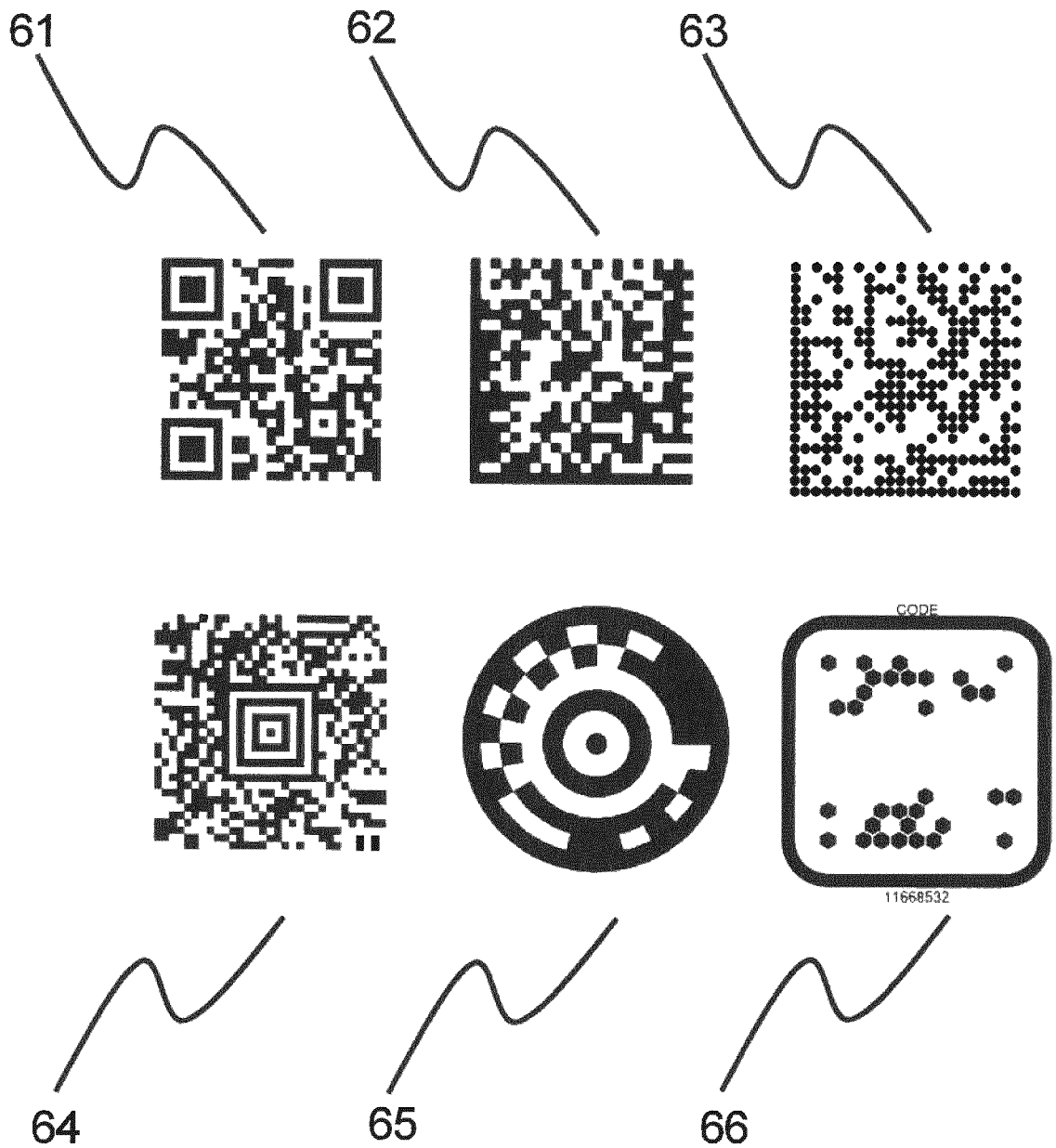
FIG. 6 shows six different 2D codes.

The identifier may include alphanumerical data, such as a name and/or numbers, but preferably it is a machine readable identification code. The latter allows for faster identification without errors. There is no restriction on the type of machine-readable identification code. It may be a simple bar code, but it may also be a so-called 2D code. Preferred 2D codes include a barcode, a QR code, a datamatrix code, a cool-data-matrix code, an aztec code, an upcode, a trillcode, a quickmark code, a shot code, a mcode, a beetagg and the like. Examples of such 2D codes are illustrated by FIG. 6.

The identifier may be applied at any time on the temporary carrier, but is preferably already present on an assembly (40) prior to the inkjet printing of the decorative image. For example, it may already be present upon delivery of the temporary carrier to the tannery in the form of consecutive serial numbers or codes on a roll of plastic foil or paper.

Positioning Markers

Positioning markers serve the purpose of positioning the assembly (40) on an inkjet printer. This is especially advantageous when a scanning operation was performed at an earlier stage on the assembly (40) for detecting holes, bite marks or other surface defects on the surface of the natural leather. The scanned information can then be retrieved for inkjet printing an optimal lay-out of different desired leather pieces taking into account the non-printable areas caused by holes, bite marks or other surface defects. This results in improved productivity due to substantial time gain.

The positioning markers on the assembly may be scanned by a scanner in the inkjet printer for identifying the printable area. This allows for automation and productivity improvements.

Alternatively, the position markers can be used to bring them in registration to fixed markers on the printing table of an inkjet printer. In the latter case, no additional scanner in the inkjet printer is necessary resulting in a less expensive inkjet printer.

The positioning markers may be applied at any time on the temporary carrier, but are preferably already present on an assembly (40) prior to the inkjet printing of the decorative image. For example, it may already be present upon delivery of the temporary carrier to the tannery on a roll of plastic foil or paper.

There is no restriction on the shape of the positioning markers. A positioning may be, for example, a cross (10 in FIG. 2) or a cross in a circle.

Decorative Images

There is no real limitation on the type of decorative image inkjet printed (6) on the leather using one or more pigmented inkjet inks. The decorative image may consist of a single colour or it may include multiple colours such as black, white, cyan, magenta, yellow, red, orange, violet, blue, green and brown.

Figure 5:
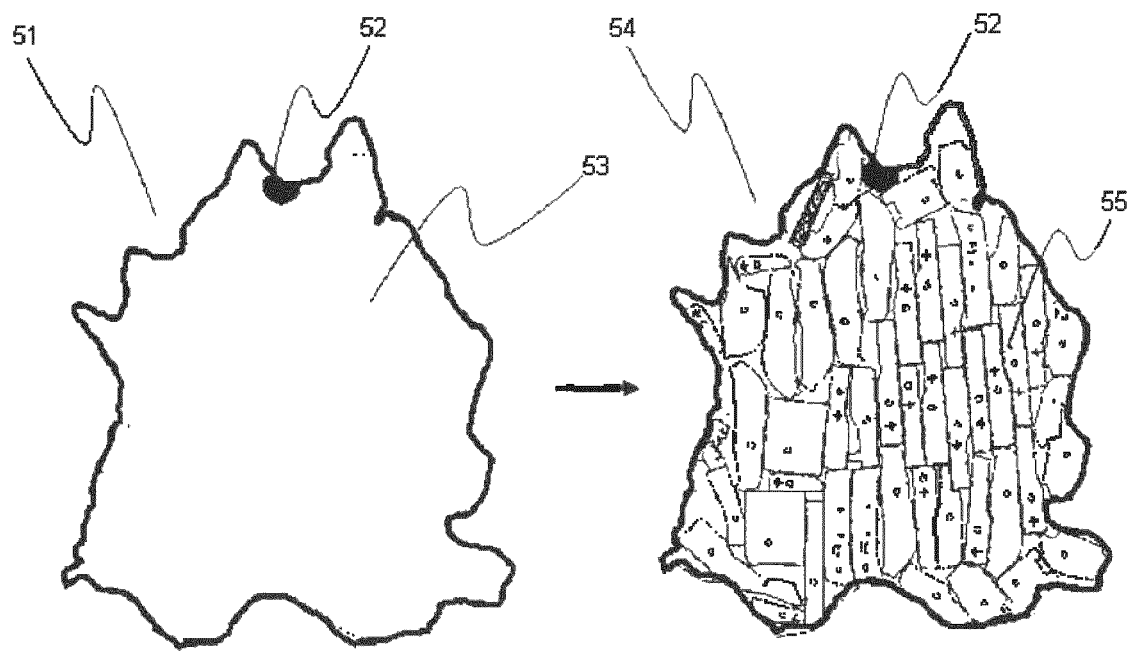
FIG. 5 shows, preferably on a computer screen, a leather image (51) having a non-printable area (52), such as a bite mark, and a printable area (53), wherein desired decorated leather pieces are nested as sub-images (55) in order to obtain a leather image containing nested sub-images (54).

The decorative image may be printed as an uninterrupted image, where individual leather pieces are cut out or alternatively the decorative image may consist of sub-images, for example representing the different leather pieces required to assemble a leather article. In the latter case, the sub-images (55) are preferably nested into a decorative image containing sub-images (54) as shown in FIG. 5. By nesting sub-images, the waste of unused leather having a printable area (53) can be minimized, which represents a clear economic benefit.

The decorative image may also include cutting lines for facilitating the cutting of leather pieces. Cutting may be performed manually using these cutting lines, but is preferably done by using some kind of automation for the cutting of leather, such as e.g. implemented in the Versalis™ cutting machines from LECTRA.

Figure 2:
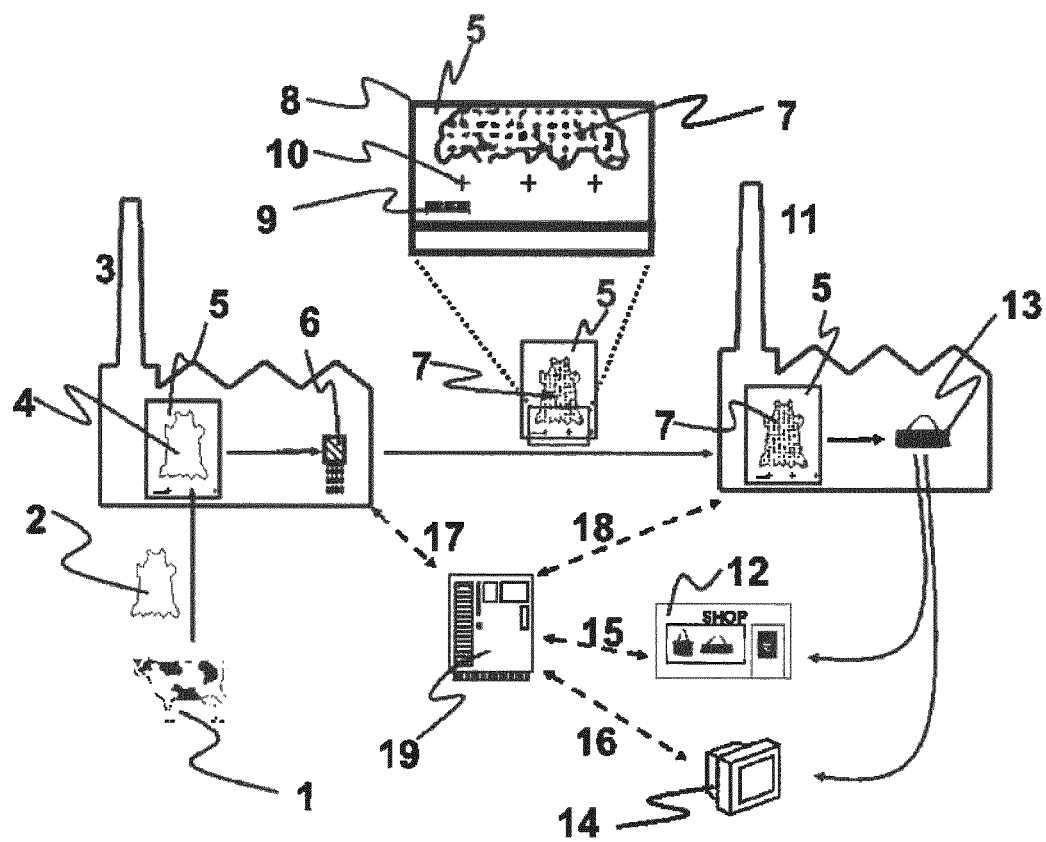
FIG. 2 show a process of leather manufacturing according to the present invention wherein the full arrows relate to a physical transport and the dashed arrows relate to an exchange of information, e.g. over the internet. On a computer server (19) data is stored about leather articles that are manufactured by the leather article manufacturer (11). Customers can view the articles over a digital connection (15, 16), such as the internet, from a shop (12) or a website (14) at home. The customer may select a specific leather article (13) with a desired decoration and personalization, where after this selection is communicated via a digital connection (15,16) to the computer server (19) together with an identification code. A hide (2) from a cow (1) is then tanned, crusted and base-coated at a tannery (3) which retrieves and uses the desired decoration and data of the selected leather article from the computer server (19) by a digital connection (17) to apply it by inkjet printing (6) on the base coated leather crust (4) mounted on a temporary carrier (5) by an adhesive. In addition to the decorated natural leather (7), the temporary carrier (5) is applied with an identifier (9) and a positioning marker (10). This assembly is then transported to the leather article manufacturer (11). The leather article manufacturer (11) uses the identifier (9) to assemble the desired leather article (13) from the inkjet printed leather pieces cut out from the decorated natural leather (7). The leather article manufacturer (11) uses the identifier (9) to retrieve the correct delivery address obtained from the shop (12) or the website (14) and delivers the leather article (13) to the customer.

Alternatively, no cutting lines are printed, and the whole cutting pattern is stored in a computer, such as the computer server (8) of FIG. 2. For example, U.S. Pat. No. 5,757,950 (DUERKOPP ADLER AG) discloses a process for cutting or stamping individual parts from an animal skin in which the contours of the individual parts are stored in a computer and can be assembled to form a cutting pattern, and, for optimizing the cutting, the cutting pattern is established individually as a function of the quality of the skin and is projected by a projection device onto the skin, with which the advantages of large-area nesting can be combined with the advantages of small-area cutting or stamping.

Base Coats

The base coat applied on the crust leather provides a level of image quality commensurate to the luxury aspect of leather as the low viscosity of inkjet inks lets them penetrate rapidly into the leather resulting in a reduced image quality.

The base coat may be applied as a single layer, or may be applied as multiple layers. The multiple layers may even have a different composition for improving properties like adhesion or flexibility.

The base coat preferably includes a polymer or copolymer based on polyurethane, as this has been found to improve flexibility to the printed leather. The base coat preferably further includes a polyamide polymer or copolymer, as polyamide has been found to improve the compatibility with the crust leather and to improve the strength of the base coat.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and CS065-195 from INCOREZ. The dry weight of the polyurethane in the base coat is preferably in the range of 1 to 6 $g/m^2$.

Suitable polyamides include the PA emulsion types ED310 and 161148 CX from MICHELMAN. The dry weight of the polyamide in the base coat is preferably less than 7 g/m², more preferably less than 5 g/m².

Although polyurethanes and/or polyamides are preferred as the polymers for the base" coat, other polymers may be used preferably in combination with the polyurethanes and/or polyamides. Such polymers preferably have an elongation at break of more than 200%, more preferably 300%. The elongation at break is measured according to ISO527-2, for example, with a MTS Exceed™ testing apparatus from MTS Systems Corporation.

Another type of preferred polymers to be used in the base coat are polyacrylates. Polyacrylates provide good flexibility and stabilize pigment dispersions in the base coat.

In a preferred embodiment, the base coat preferably includes a polymer or copolymer based on polyurethane and polymer or copolymer based on a polyacrylate. Such a combination brings excellent flexibility even in the presence of pigments.

Preferred polyacrylates are Roda™ Base 5514 from TFL and Primal™ HPB980 from LANXESS. A suitable polymeric acrylate emulsion is Bioflex™ KGA from LMF Biokimica.

A cross-linker may be incorporated in the base coat to improve the strength of the base coat and the adhesion to crust leather. Preferred cross-linkers include aldehyde based cross-linkers such as formaldehyde, melamine formaldehyde derivatives, urea formaldehyde resins, glyoxal and gluraraldehyde, epoxides, oxazolines, carbodiimides and isocyanates, isocyanates being particularly preferred. The dry weight of the cross-linker in the base coat is preferably less than 1.4 g/m², more preferably less than 1.0 g/m².

The base coat is preferably applied by spraying, but may be applied by any coating technique known, such as knife coating, extrusion coating, slide hopper coating and curtain coating. It can be applied prior to attaching the crusted leather to temporary carrier or it may be applied when the crusted leather is already attached to the temporary carrier.

The base coat may be transparent, but is preferably an opaque base coat. If an opaque base coat is applied when the crusted leather is already attached to the temporary carrier, then preferably measures are taken to either not spray or coat the area of the temporary carrier where an identifier or a positioning marker is located, or otherwise to cover them prior to spraying or coating with, for example, a removable piece of tape. This way the identifier or the positioning marker can still be observed by the human eye.

The base coat may be a white base coat to enhance the colour vibrancy of the inkjet printed image, but preferably the base coat has a colour similar to that of the corium and the grain. Any desired colour may be chosen for the corium or grain and the base coat, such as red, green, brown, black, blue . . . .

Pigmented Inkjet Inks

The one or more pigmented inkjet inks that are inkjet printed may be selected from aqueous pigmented inkjet inks, solvent based pigmented inkjet inks and radiation curable pigmented inkjet inks. However, the one or more pigmented inkjet inks are preferably one or more radiation curable inkjet ink, most preferably one or more UV curable inkjet inks.

The one or more pigmented inkjet inks preferably contain organic colour pigments as they allow for obtaining a high colour gamut on natural leather. Carbon black and titanium dioxide are inorganic pigments, which can be advantageously used in the present invention for composing black respectively white pigmented inkjet inks.

An organic colour pigment may be chosen from those disclosed by HERBST, Willy, et al. Industrial Organic Pigments, Production, Properties, Applications. 3rd edition. Wiley—VCH, 2004. ISBN 3527305769. Suitable colour pigments are disclosed in paragraphs [0128] to [0138] of WO 2008/074548 (AGFA GRAPHICS).

In a preferred embodiment, the one or more pigmented inkjet inks form a CMYK(W) or CRYK(W) inkjet ink set.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size of an organic colour pigment and an inorganic black pigment is preferably between 0.050 and 1 μm, more preferably between 0.070 and 0.300 μm and most preferably between 0.080 and 0.200 μm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

A white pigment preferably has a numeric average pigment particle size larger than 180 nm in order to have a strong opacifying capability. Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

When using UV curable pigmented inkjet inks, polymerizable compounds and at least one photoinitiator is present in the inkjet ink.

Any polymerizable compound commonly known in the art may be employed. The polymerizable compound may be any monomer or oligomer found in the Polymer Handbook Vol 1+2, 4th edition, edited by J. BRANDRUP et al., Wiley-Interscience, 1999. An oligomer in the present invention is understood to contain 2 to 8 repeating monomeric units. Preferred monomers and oligomers are those listed in [0106] to [0115] in EP 1911814 A (AGFA).

Preferably a monomer or oligomer capable of free radical polymerization is used as polymerizable compound. A combination of monomers, oligomers and/or prepolymers may also be used. The monomers, oligomers and/or prepolymers may possess different degrees of functionality, and a mixture including combinations of mono-, di-, tri-and higher functionality monomers, oligomers and/or prepolymers may be used. However preferably an amount of at least 60 to 100 wt % of monofunctional polymerizable compounds is used in the UV curable pigmented inkjet ink with the wt % based on the total weight of the inkjet ink. The viscosity of the radiation curable inkjet inks can be adjusted by varying the amount of specific monomers and oligomers.

The UV curable inkjet ink contains one or more photoinitiators, preferably one or more free radical photoinitiators. A free radical photoinitiator is a chemical compound that initiates polymerization of monomers and oligomers when exposed to actinic radiation by the formation of a free radical.

Suitable photo-initiators are disclosed in CRIVELLO, J. V., et al. VOLUME III: Photoinitiators for Free Radical Cationic. 2nd edition. Edited by BRADLEY, G., London, UK: John Wiley and Sons Ltd, 1998. p. 287-294.

In a particularly preferred embodiment, the one or more photoinitiators include an acylphosphine oxide photoinitiator and a thioxanthone photoinitiator. Such a combination allows for fast UV curing with UV LEDS emitting above 370 nm. UV LEDs are more economical in operating the inkjet printing than mercury lamps.

In order to increase the photosensitivity further, the UV curable inkjet ink may additionally contain co-initiators. Suitable examples of co-initiators can be categorized in three groups: (1) tertiary aliphatic amines, such as methyldiethanolamine and N-methylmorpholine; (2) aromatic amines such as 2-(dimethylamino)ethylbenzoate; and (3) (meth)acrylated amines such as dialkylamino alkyl(meth)acrylates and N-morpholinoalkyl-(meth)acrylates. The preferred co-initiators are aminobenzoates.

A preferred amount of photoinitiator and co-initiator is 0.1 to 30 wt %, and most preferably 5 to 10 wt % of the total weight of the UV curable inkjet ink.

The one or more pigmented inkjet inks may contain further additives such as surfactants, polymerization inhibitors and dispersants for the colour pigments.

The preparation of pigmented UV curable inkjet inks is well-known to the skilled person. Preferred methods of preparation are disclosed in paragraphs [0076] to [0085] of WO 20111069943 (AGFA).

Top Coats

A top coat may be applied onto the decorative image and the base coat for enhancing the scratch resistance of the decorative image.

The top coat may be applied as a single layer, or may be applied as multiple layers. The multiple layers may even have a different composition for improving properties like scratch resistance.

The protective top coat may have the same or a similar composition as the base coat. Usually the protective top coat is somewhat optimized according to the leather application. For example, flexibility does not play an important role for a leather book cover contrary to leather shoes. Hence, the protective top coat for a book cover may be optimized towards scratch resistance.

The top coat preferably includes a cross-linker and a polymer or copolymer based on polyurethane and/or polyamide.

The top coat preferably includes a polymer or copolymer based on polyurethane as this is beneficial for the flexibility of the printed leather. A polyamide polymer, which is found to have a high compatibility with a polyurethane binder, is preferably included if the scratch resistance needs to be improved.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and CS065-195 from INCOREZ. The dry weight of the polyurethane in the top coat is preferably in the range of 1 to 6 $g/m^2$.

Suitable polyamides include the PA emulsion types ED310 and 161148 CX from MICHELMAN. The dry weight of the polyamide in the top coat is preferably less than 7 $g/m^2$, more preferably less than 5 $g/m^2$.

Although polyurethanes and/or polyamides are preferred as the polymers for the top coat, other polymers may be used preferably in combination with the polyurethanes and/or polyamides. Such polymers preferably have an elongation at break of more than 200%, more preferably 300%. The elongation at break is measured according to IS0527-2, for example, with a MTS Exceed™ testing apparatus from MTS Systems Corporation.

Another type of preferred polymers to be used in the top coat are polyacrylates. Polyacrylates provide good flexibility to the top coat.

In a preferred embodiment, the top coat preferably includes a polymer or copolymer based on polyurethane and polymer or copolymer based on a polyacrylate. Such a combination brings excellent flexibility.

Preferred polyacrylates are Roda™ Base 5514 from TFL and Primal™ HPB980 from LANXESS. A suitable polymeric acrylate emulsion is Bioflex™ KGA from LMF Biokimica.

A cross-linker may be incorporated in the protective top coat to improve the scratch resistance. Preferred cross-linkers include those mentioned above for the base coat. The dry weight of the cross-linker in the protective top coat is preferably less than 1.4 $g/m^2$, more preferably less than 1.0 $g/m^2$.

The top coat is preferably applied by spraying, but may be applied by the same coating techniques as mentioned above for the base coat.

The top coat is most preferably a transparent top coat, but may be a translucent top coat. By having a transparent top coat, the inkjet printed image is clearly visible through the top coat. By using a translucent top coat, a special aesthetic effect is created.

If a matt top surface is desired for the inkjet printed leather, a matting agent may be included. Any suitable matting agent may be used. Preferred matting agent include silica. A preferred commercially available example of a silica dispersion is Euderm™ SN2 from LANXESS.

Computer Server

In FIG. 2, the computer server (19) operates a program. Part or whole of the computer server and/or the functional units or blocks thereof may be implemented in one or more circuits or circuitry, such as an integrated circuit(s) or as an LSI (large scale integration). Each functional unit or block of the computer server may be individually made into an integrated circuit chip. Alternatively, part or whole of the functional units or blocks may be integrated and made into an integrated circuit chip.

A program which is operated in the computer server is a program controlling a processor in order to realize functions of the various preferred embodiments according to the present invention. Therefore, information which is handled by the computer server is temporarily accumulated in a RAM at the time of the processing. Thereafter, the information may be stored in various types of circuitry in the form of ROMs and HDDs, and read out by circuitry within, or included in combination with, the computer server as necessary, and modification or write-in is performed thereto. As a recording medium storing the program, any one of a semiconductor medium (for example, the ROM, a non-volatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In addition, a portion of a terminal device, a wireless base station, a host system, or other devices, or the whole thereof may be realized as an LSI which is typically an integrated circuit. Each functional unit or block of the computer server may be individually chipped, or a portion thereof, or the whole thereof may be chipped by being integrated. In a case of making each functional block or unit as an integrated circuit, an integrated circuit controller that controls the integrated circuits, is added.

Finally, it should be noted that the description referring to "circuit" or "circuitry" is in no way limited to an implementation that is hardware only, and as persons of ordinary skill in the relevant art would know and understand, such descriptions and recitations of "circuit" or "circuitry" include combined hardware and software implementations in which the circuit or circuitry is operative to perform functions and operations based on machine readable programs, software or other instructions in any form that are usable to operate the circuit or circuitry.

There is no limitation on the location of the computer server (19), it may be located at the tannery (3), at the leather article manufacturer (11), at the shop (12) or even at a third party location.

Digital connections (15 to 18) with the computer server may be made in any form. It can be a connection using an optical fibre a wireless connection, such as a Wi-Fi connection according to the IEEE 802.11 standard.

Inkjet Printing Devices

The one or more pigmented inkjet ink are jetted by one or more print heads ejecting small droplets in a controlled manner through nozzles onto natural leather moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head.

A preferred piezoelectric print head is a so-called through-flow piezoelectric drop-on-demand print head. By using through-flow print heads, the reliability is enhanced and thus a more efficient and economical method of manufacturing high quality decorated natural leather articles is obtained. Such a print head is, for example, available from TOSHIBA TEC as the CF1ou print head.

However, the inkjet printing method according to the present invention is not restricted to piezoelectric inkjet printing. Other inkjet print heads can be used and include various types, such as a continuous type print head.

The inkjet print head normally scans back and forth in a transversal direction across the moving leather surface, known as a multi-pass printing mode. Sometimes the inkjet print head does not print on the way back. Bi-directional printing is preferred for obtaining a high areal throughput.

Another preferred printing method is by a "single pass printing process", which can be performed by using page wide inkjet print heads or multiple staggered inkjet print heads that cover the entire width of the leather surface. In a single pass printing process, the inkjet print heads usually remain stationary and the ink-receiving leather surface is transported under the inkjet print heads.

An advantage of using a multi-pass printing mode is that the liquid UV curable inkjet ink is cured in a consecutive passes, rather than in a single pass that would require a curing device with a high UV output. The print head lifetime is also larger for multi pass printing. While in single pass printing one side shooter is sufficient to replace the whole print head, in multi pass printing side shooters and even failings can be tolerated. Also the cost of a multi-pass printer is usually much lower, especially for large format crusted leather.

Curing Devices

If aqueous or solvent based pigmented inkjet inks are used, then some curing device for evaporation of water and organic solvents is required. Suitable curing means include a heat radiation means like a hot air dryer, an oven, or an infrared light source, such as an infrared laser, one or more infrared laser diodes or infrared LEDs.

An effective infrared radiation source for aqueous inkjet inks has an emission maximum between 0.8 and 2.5 μm, preferably between 0.8 and 1.5 μm. Such an infrared radiation source is sometimes called a NIR dryer.

If UV curable pigmented inkjet inks are used, then curing is usually performed by ultraviolet radiation alone. If so-called hybrid UV curable pigmented inkjet inks containing also water or organic solvents, then the curing device preferably further also includes curing means used for aqueous or solvent based pigmented inkjet inks.

In inkjet printing, the curing device may be arranged in combination with the print head of the inkjet printer, travelling therewith so that the inkjet ink is exposed to curing radiation very shortly after been jetted.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages such as a fast curing speed and a high curing degree.

In a particularly preferred embodiment, the UV curing is performed using UV LEDs having an emission wavelength higher than 370 nm.

For facilitating curing, the inkjet printer may include one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLE

Materials

All materials used in the following examples were readily available from standard sources such as Aldrich Chemical Co. (Belgium) and Acros (Belgium) unless otherwise specified. The water used was demineralized water.

PB15:4 is an abbreviation used for Hostaperm™ Blue P-BFS, a C.I. Pigment Blue 15:4 pigment from CLARIANT.

MP1 is an abbreviation used for Ink Jet Magenta E7B LV3958, a quinacridone pigment from CLARIANT.

MP2 is an abbreviation used for Chromophtal™ Jet Magenta 2BC, a quinacridone pigment from BASF.

PY150 is a C.I. Pigment Yellow 150 pigment for which Cromophtal yellow LA2 from BASF was used.

PB7 is a carbon black pigment for which Special Black™ 550 from EVONIK was used.

SYN is the dispersion synergist according to Formula (A):

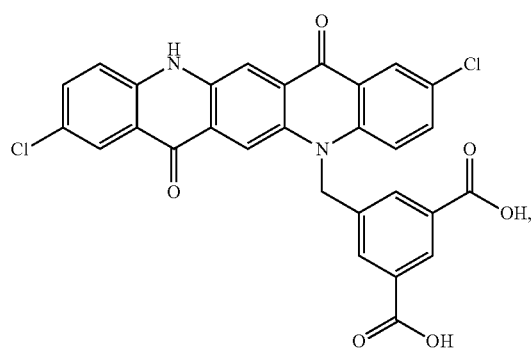

Formula (A)

and was synthesized in the same manner as described in Example 1 of WO 2007/060254 (AGFA GRAPHICS) for the synergist QAD-3.

E7701 is a polyacrylate dispersion agent available as Efka™ 7701 from BASF.

S35000 is an abbreviation used for SOLSPERSE™ 35000, a polyethyleneimine-polyester hyperdispersant from LUBRIZOL.

PEA is 2-phenoxyethyl acrylate available as Sartomer™ SR339C from ARKEMA.

IBOA is isobornylacrylate available as Sartomer™ SR506D from ARKEMA.

IDA is isodecyl acrylate available as Sartomer™ SR395 from ARKEMA.

THFFA is tetrahydrofurfuryl acrylate, available as Sartomer™ SR285 from ARKEMA.

VCL is N-vinyl caprolactam available from BASF BELGIUM, NV.

VEEA is 2-(2'-vinyloxyethoxy)ethyl acrylate, a difunctional monomer available from NIPPON SHOKUBAI, Japan.

DPGDA is dipropylene glycol diacrylate available as Sartomer™ SR508 from ARKEMA.

CN963B80 is a urethane acrylate oligomer available as Sartomer™ CN963B80 from ARKEMA.

CN3755 is an acrylated amine synergist available as Sartomer™ CN 3755 from ARKEMA.

TPO is trimethylbenzoyl diphenyl phosphine oxide supplied as Omnirad™ TPO by IGM.

ITX is Darocur™ ITX is an isomeric mixture of 2- and 4-isopropylthioxanthone from BASF.

BAPO is a bis(2,4,6-trimethylbenzoyl)-phenylphosphineoxide photoinitiator available as Irgacure™ 819 from BASF.

INHIB is a mixture forming a polymerization inhibitor having a composition according to Table 1.

TABLE 1

| Component | wt % |
|---|---|
| DPGDA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

UV10 is 4-hydroxy-2,2,6,6-tetramethylpiperidinooxy sebacate available as Irgastab™ UV 10 from BASF.

T410 is a silicone surfactant available as Tegoglide™ 410 from EVONIK.

SL7500 is a silicone surfactant available as Silwet™ L7500 from OSI SPECIALITIES BENELUX NV P dispersion is a concentrated TiO2 dispersion (63%) available as Contex™ Bianco Ultra from SAMIA S.p.a.

PA1 is an acrylate binder available as RODA™ Base 5514 from TFL.

PA2 is an acrylate binder available as Primal™ HPB980 from LANXESS.

PU is an acrylate binder available as Astacin™ Fondo UH TF from BASF.

X-linker is an aziridine type cross linker available as Reticolante™ AA4010 from NOVAKEM SRL.

Measurement Methods

1. Viscosity

The viscosity of the UV curable inkjet inks was measured at 45° C. and at a shear rate of 1,000 s$^{-1}$ using a Rotovisco™ RV1 viscometer from HAAKE.

2. Surface Tension

The static surface tension of the UV curable inkjet inks was measured with a KRÜSS tensiometer K9 from KRÜSS GmbH, Germany at 25° C. after 60 seconds.

3. Average Particle Size

The average particle size (diameter) was determined with a Brookhaven Instruments Particle Sizer BI90plus based upon the principle of dynamic light scattering. The inkjet ink was diluted with ethyl acetate to a pigment concentration of 0.002 wt %. The measurement settings of the BI90plus were: 5 runs at 23° C., angle of 90°, wavelength of 635 nm and graphics=correction function.

Example 1

This example illustrates the manufacturing of decorating natural leather wherein the leather is attached to a plastic foil coated with an adhesive.

Preparation of Pigmented UV Curable Inkjet Inks

First concentrated pigment dispersions CPC, CPM1, CPM2, CPY and CPK were prepared. Then these concentrated pigment dispersions were used to prepare a pigmented UV curable inkjet ink set according to Table 7.

Concentrated Cyan Pigment Dispersion CPC

A concentrated pigment dispersion was made by mixing the components according to Table 2 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel. The wt % in Table 2 is based on the total weight of the pigment dispersion.

TABLE 2

| Component | wt % |
|---|---|
| PB15:4 | 16.00 |
| S35000 | 16.00 |
| INHIB | 1.00 |
| DPGDA | 67.00 |

Concentrated Magenta Pigment Dispersion CPM1

The concentrated pigment dispersion CPM1 was prepared in the same manner as described above for the cyan pigment dispersion CPC except that the ingredients used were according to Table 3.

TABLE 3

| Component | wt % |
|---|---|
| MP1 | 15.00 |
| SYN | 0.30 |
| E7701 | 15.00 |
| INHIB | 1.00 |
| PEA | 15.00 |
| DPGDA | 53.70 |

Concentrated Magenta Pigment Dispersion CPM2

The concentrated pigment dispersion CPM2 was prepared in the same manner as described above for the cyan pigment dispersion CPC except that the ingredients used were according to Table 4.

TABLE 4

| Component | wt % |
|---|---|
| MP2 | 16.00 |
| SYN | 0.24 |
| S35000 | 16.00 |
| INHIB | 1.00 |
| PEA | 15.00 |
| DPGDA | 66.76 |

Concentrated Yellow Pigment Dispersion CPY

The concentrated pigment dispersion CPY was prepared in the same manner as described above for the cyan pigment dispersion CPC except that the ingredients used were according to Table 5.

TABLE 5

| Component | wt % |
|---|---|
| PY150 | 16.00 |
| S35000 | 16.00 |
| INHIB | 1.00 |
| DPGDA | 67.00 |

Concentrated Black Pigment Dispersion CPK

The concentrated pigment dispersion CPK was prepared in the same manner as described above for the cyan pigment dispersion CPC except that the ingredients used were according to Table 6.

TABLE 6

| Component | wt % |
|---|---|
| PB7 | 16.00 |
| S35000 | 16.00 |
| INHIB | 1.00 |
| DPGDA | 67.00 |

Pigmented UV Curable Inkjet Ink Set

The UV curable inkjet ink set was prepared using the above prepared concentrated pigment dispersions and combining them with the other components according to Table 7. The wt % is based on the total weight of the inkjet ink.

TABLE 7

| wt % of: | C | Light C | M | Light M | Y | K |
|---|---|---|---|---|---|---|
| PB15:4 | 2.50 | 0.62 | — | — | — | 0.60 |
| MP1 | — | — | 4.00 | 1.00 | — | — |
| MP2 | — | — | — | — | — | 0.30 |
| SYN | — | — | 0.08 | 0.02 | — | 0.01 |
| PY150 | — | — | — | — | 2.45 | — |
| PB7 | — | — | — | — | — | 1.60 |
| E7701 | — | — | 4.00 | 1.00 | 1.63 | — |
| S35000 | 2.50 | 0.62 | — | — | — | 2.50 |
| IBOA | 18.95 | 18.95 | 18.95 | 18.95 | 18.95 | 18.95 |
| VCL | 9.90 | 7.50 | 7.50 | 9.70 | 10.00 | 9.50 |
| PEA | 16.35 | 20.00 | 12.00 | 25.23 | 17.25 | 16.15 |
| THFFA | 14.12 | 13.35 | 15.13 | 5.88 | 13.74 | 12.47 |
| IDA | 5.00 | 5.00 | 5.00 | 5.00 | 5.00 | 5.00 |
| DPGDA | 10.47 | 7.11 | 18.33 | 9.35 | 10.79 | 10.48 |
| CN963B80 | 4.00 | 7.50 | — | 4.50 | 4.00 | 3.00 |
| TX | 2.00 | 0.50 | 2.95 | 0.50 | 2.00 | 5.00 |
| TPO | 2.95 | 9.95 | 2.95 | 9.95 | 2.95 | 2.95 |
| BAPO | 2.25 | — | 3.50 | — | 2.25 | 2.00 |
| CN3755 | 7.50 | 7.50 | 4.00 | 7.50 | 7.50 | 8.00 |
| INHIB | 0.16 | 0.04 | 0.27 | 0.07 | 0.14 | 0.15 |
| UV10 | 0.35 | 0.35 | 0.35 | 0.35 | 0.35 | 0.35 |
| SL7500 | 1.00 | 1.00 | 1.00 | 1.00 | 1.00 | 1.00 |

Light cyan and Light magenta inkjet inks were included in the ink set to further enhance the image quality. Light inks reduce graininess in the inkjet printed image when low density colours are present in the image.

The inkjet inks exhibited the following properties according to Table 8.

TABLE 8

| Physical property | C | Light C | M | Light M | Y | K |
|---|---|---|---|---|---|---|
| Viscosity (45° C.) | 9.6 | 9.9 | 10.9 | 10.2 | 10.1 | 10.2 |
| Surface tension (mN/m) | 30.6 | 29.2 | 27.9 | 29.6 | 28.6 | 29.7 |
| Average particle size (nm) | 129 | 147 | 169 | 175 | 191 | 123 |

Preparation of Base Coat BC1

A base coat BC1 was prepared by mixing the following ingredients according to Table 9.

TABLE 9

| wt % of: | BC1 |
|---|---|
| WP dispersion | 12.2 |
| PA1 | 40.7 |
| PA2 | 2.0 |
| PU | 4.1 |
| X-linker | 0.2 |
| water | 40.8 |

Preparation of Decorated Leather LS1

An inkjet printed leather LS1 was prepared in the following manner.

First, an A4 size piece of crusted calfskin leather from NUT1 IVO, Santa Croce sull'Arno was attached to an A3 size PET-foil coated with a pressure sensitive adhesive (Synaps™ OM135/AP from AGFA) as temporary carrier. LS1 was written as identifier on the PET-foil with a black marker and covered by a piece of transparent tape.

Subsequently the assembly of the PET-foil and the crusted leather was spray-coated with six layers of the white base coat BC1 using a spray coat pilot mini gun from WALTHER PILOT. After each application of a layer of the white base coat, the assembly was dried at a temperature of 60° C.

Stickiness of the spray coated temporary carrier not covered by the leather was assessed by putting the spray coated assembly of the PET-foil and the crusted leather of in stack with other A3 size PET foils together with a weight of 15 kg on top of this stack for 24 h. No stickiness was observed.

The spray-coated assembly was positioned on one of the six vacuum zones of a flatbed inkjet printer Jeti™ Mira LED from AGFA GRAPHICS NV and printed with a decorative image using the above pigmented UV curable inkjet inks.

After inkjet printing, the leather samples were heat pressed in a Secabo™ TPD12 pneumatic transfer press at a temperature of 175° C. and a pressure of 4 bar for 35 seconds. The transparent tape covering the identifier was removed, making the identifier readable again.

Example 2

This example illustrates the manufacturing of decorating natural leather wherein the leather is attached to a paper foil using a spray adhesive.

Preparation of Decorated Leather LS2

A spray adhesive (Scotch-Weld 77 from 3M) was sprayed on the corium side of an A4 size piece of crusted calfskin leather from NUTI IVO, Santa Croce sull'Arno. The crusted leather was then applied with its corium side to an A3 size of Kraft paper. LS2 was written with a black marker as identifier on the Kraft paper not covered by the leather. The identifier was then covered by a piece of transparent tape.

The assembly of the Kraft paper and the crusted leather was spray-coated with a layer of the white base coat BC1 using a spray coat pilot mini gun from WALTHER PILOT and dried at a temperature of 60° C.

The spray-coated assembly was positioned on one of the six vacuum zones of a flatbed inkjet printer Jeti™ Mira LED from AGFA GRAPHICS NV and printed with a decorative image using the above pigmented UV curable inkjet inks.

After inkjet printing, the leather samples were heat pressed in a Secabo™ TPD12 pneumatic transfer press at a temperature of 175° C. and a pressure of 4 bar for 35 seconds. The transparent tape covering the identifier was removed, making the identifier readable again.

REFERENCE SIGNS LIST

TABLE 10

| | |
|---|---|
| 1 | Cow |
| 2 | Hide |
| 3 | Tannery |
| 4 | Base coated leather crust |
| 5 | Temporary carrier |
| 6 | Inkjet printing |
| 7 | Decorated natural leather |
| 8 | Magnification of part of decorated natural leather |
| 9 | Identifier |
| 10 | Positioning marker |
| 11 | Leather article manufacturer |
| 12 | Shop |
| 13 | Leather article |
| 14 | Website |
| 15 to 18 | Digital connection |
| 19 | Computer server |
| 31 | Grain |
| 32 | Junction of grain and corium |
| 33 | Corium |
| 34 | Full grain leather |
| 35 | Top grain leather |
| 36 | Split leather |
| 40 | Assembly |
| 41 | Decorated natural leather |
| 42 | Topcoat |
| 43 | Decorative image |
| 44 | Base coat |
| 45 | Crusted leather |
| 46 | Adhesive |
| 47 | Temporary carrier |
| 51 | Leather image |
| 52 | Non-printable area |
| 53 | Printable area |
| 54 | Leather image containing nested sub-images |
| 55 | Sub-image (intended leather piece) |
| 61 | QR Code |
| 62 | Data Matrix |
| 63 | Cool Data Matrix |
| 64 | Aztec |
| 65 | Shotcode |
| 66 | Beetagg |
| 71 | Decorated natural leather |
| 72 | Close-up |
| 73 | Decorative image |
| 74 | Identification code |

The invention claimed is:

1. A method of manufacturing decorated natural leather comprising the steps of:
    attaching a crusted leather (45) by its corium side with an adhesive (46) to a temporary carrier (47); and
    inkjet printing the crusted leather (45) with a decorative image on its grain side with one or more pigmented inkjet inks;
    wherein the surface area of the temporary carrier (47) is larger than the surface area of the crusted leather (45).

2. The method of claim 1, wherein the temporary carrier (47) includes
    an identifier (9) containing alphanumeric data or a machine readable code; and/or
    one or more positioning markers (10).

3. The method of claim 1, wherein the temporary carrier (47) is a paper foil or a plastic foil.

4. The method of claim 3, wherein the temporary carrier is a plastic foil and the plastic foil is a transparent or translucent plastic foil.

5. The method of claim 1, wherein the adhesive is applied by coating or spraying.

6. The method of claim 1, further comprising a step of scanning the temporary carrier (47) with the attached crusted leather for determining a printable surface on the crusted leather (45).

7. The method of claim 6, wherein the temporary carrier (47) comprises markings for positioning the temporary carrier with the attached crusted leather on an inkjet printer so that the decorative image (43) is printed on the printable surface.

8. The method of claim 1, wherein the adhesive (46) exhibits a higher adhesion to the temporary carrier (47) than to the crusted leather (45).

9. The method of claim 1, wherein a base coat (44) is applied on the grain side of the crusted leather (45) before the step of inkjet printing.

10. The method of claim 9, wherein the base coat (44) comprises a polymer or copolymer based on polyurethane.

11. The method of claim 9, wherein the base coat (44) is also applied on the temporary carrier coated or sprayed with the adhesive.

12. The method of claim 1, wherein the adhesive (46) is a pressure sensitive adhesive.

13. The method of claim 1, wherein the one or more pigmented inkjet inks are one or more UV curable pigmented inkjet inks.

14. An assembly (40) of a decorated natural leather (41) attached by an adhesive (46) to a temporary carrier (47) as obtained by the method of claim 1.

15. An identification method of using an identifier containing alphanumeric data or a machine readable code on a temporary carrier (47) whereon a decorated natural leather (41), having a base coat (44) applied on a grain side of a crusted leather (45) and having a decorative image inkjet printed on the base coat using one or more pigmented inkjet inks, is attached by an adhesive (46) for at least one of the following purposes:
   a) identifying the leather article manufacturer;
   b) identifying a leather article to be manufactured using the decorated natural leather by a leather article manufacturer for a customer;
   c) cutting the decorated natural leather (41) into leather pieces;
   d) identifying the customer of the leather article;
   e) authentication of the leather article; and
   f) delivering the leather article to the customer.

* * * * *